US010912282B2

United States Patent
McKee et al.

(10) Patent No.: US 10,912,282 B2
(45) Date of Patent: Feb. 9, 2021

(54) SMART ANIMAL COLLAR SYSTEM

(71) Applicant: SMART TRACKING TECHNOLOGIES, LLC, Jacksonville, FL (US)

(72) Inventors: Joseph T. McKee, Stamford, CT (US); Michael A. Basone, Stamford, CT (US); Heberto J. Calves, Katonah, NY (US)

(73) Assignee: Smart Tracking Technologies, LLC, Jacksonville, FL (US)

( * ) Notice: Subject to any disclaimer, the term of this patent is extended or adjusted under 35 U.S.C. 154(b) by 156 days.

(21) Appl. No.: 15/258,635

(22) Filed: Sep. 7, 2016

(65) Prior Publication Data
US 2018/0064068 A1 Mar. 8, 2018

(51) Int. Cl.
A01K 27/00 (2006.01)
H04W 4/02 (2018.01)
H04W 52/02 (2009.01)
A01K 29/00 (2006.01)
A01K 11/00 (2006.01)
(Continued)

(52) U.S. Cl.
CPC .......... *A01K 27/009* (2013.01); *A01K 11/008* (2013.01); *A01K 15/021* (2013.01); *A01K 27/001* (2013.01); *A01K 29/005* (2013.01); *H04W 4/023* (2013.01);
(Continued)

(58) Field of Classification Search
CPC .. A01K 27/009; A01K 27/005; A01K 11/006; A01K 11/008; A01K 15/021
See application file for complete search history.

(56) References Cited

U.S. PATENT DOCUMENTS

D379,252 S 5/1997 McIntosh
D428,218 S 7/2000 Dehart
(Continued)

FOREIGN PATENT DOCUMENTS

CA 2918449 A1 * 1/2015 ............. A01G 22/00
EP 0601293 A2 * 6/1994 ........... A01K 11/008
(Continued)

OTHER PUBLICATIONS

"LINK AKC Smart Dog Collar". Found online Sep. 7, 2017 at amazon.com. Page dated Oct. 26, 2016. Retrieved from https://www.amazon.com/LINK-AKC-Smart-Dog-Collar/dp/B01MFG7ELX/ref=sr_1_400?s=pet-supplies&ie=UTF8&qid=1504808421&sr=1-400&keywords=tracker%2Bcollar&th=1.
(Continued)

*Primary Examiner* — Peter M Poon
*Assistant Examiner* — Morgan T Barlow
(74) *Attorney, Agent, or Firm* — Allen, Dyer, Doppelt + Gilchrist, PA

(57) ABSTRACT

A pet-monitoring system including at least one of a wearable component, base station and user device. The system utilizes data collected from each of these components as well as the state of any connections between the devices to: (i) make various determinations about the pet's health and environment; (ii) notify the user of substantial changes in the pet's health and environment; (iii) determine how to efficiently utilize communication, monitoring or interaction modules within the wearable component, base station and user device; and (iv) automate interactions with the pet using interaction modules within the wearable component, base station and user device.

12 Claims, 8 Drawing Sheets

(51) Int. Cl.
*A01K 15/02* (2006.01)
*H04W 88/04* (2009.01)

(52) U.S. Cl.
CPC ........ *H04W 52/0251* (2013.01); *H04W 88/04* (2013.01); *Y02D 30/70* (2020.08)

(56) References Cited

U.S. PATENT DOCUMENTS

| | | | |
|---|---|---|---|
| D445,707 S | 7/2001 | Zakhakyan | |
| D522,187 S | 5/2006 | Nottingham et al. | |
| D570,237 S | 6/2008 | Goetzl | |
| D673,334 S | 12/2012 | Guo | |
| 8,543,134 B2* | 9/2013 | Lopez | A01K 15/021 |
| | | | 455/411 |
| 8,934,923 B1* | 1/2015 | Golden | A01K 11/008 |
| | | | 455/426.1 |
| 8,955,462 B1* | 2/2015 | Golden | G08B 21/0261 |
| | | | 119/721 |
| D727,194 S | 4/2015 | Wilson | |
| 9,146,105 B2 | 9/2015 | Golden | |
| D747,566 S | 1/2016 | Pulliam et al. | |
| D748,997 S | 2/2016 | Block | |
| 9,261,599 B1 | 2/2016 | Golden et al. | |
| D779,989 S | 2/2017 | Lee | |
| 9,654,925 B1* | 5/2017 | Solinsky | G08B 21/0261 |
| 9,924,702 B2* | 3/2018 | Bianchi | A01K 15/021 |
| 9,961,884 B1* | 5/2018 | Landers | A01K 29/005 |
| 9,996,678 B2* | 6/2018 | Johnson | G16H 50/70 |
| D822,915 S * | 7/2018 | McKee | A01K 15/021 |
| | | | D30/152 |
| 2003/0116101 A1 | 6/2003 | Kim et al. | |
| 2005/0021371 A1* | 1/2005 | Basone | G06Q 50/22 |
| | | | 705/2 |
| 2005/0068183 A1* | 3/2005 | Yuasa | A01K 29/00 |
| | | | 340/573.1 |
| 2006/0011145 A1* | 1/2006 | Kates | A01K 15/02 |
| | | | 119/719 |
| 2011/0046792 A1* | 2/2011 | Imes | F24F 11/63 |
| | | | 700/278 |
| 2011/0223932 A1* | 9/2011 | Hole | H04W 56/0045 |
| | | | 455/456.1 |
| 2013/0013106 A1* | 1/2013 | Carelli | A01K 5/0114 |
| | | | 700/237 |
| 2013/0285815 A1 | 10/2013 | Jones, II | |
| 2014/0187273 A1 | 7/2014 | Golden | |
| 2014/0261233 A1 | 9/2014 | So | |
| 2014/0290583 A1* | 10/2014 | Yin | A01K 5/02 |
| | | | 119/51.02 |
| 2014/0324630 A1 | 10/2014 | Golden et al. | |
| 2014/0331942 A1 | 11/2014 | Sarazyn | |
| 2014/0336524 A1 | 11/2014 | Stewart | |
| 2014/0365558 A1 | 12/2014 | Golden et al. | |
| 2015/0073698 A1* | 3/2015 | Samuel | A01K 15/021 |
| | | | 701/422 |
| 2015/0107531 A1 | 4/2015 | Golden | |
| 2016/0015004 A1 | 1/2016 | Bonge, Jr. | |
| 2016/0086403 A1* | 3/2016 | Litterer | G07C 9/00111 |
| | | | 340/5.7 |
| 2016/0165853 A1* | 6/2016 | Goldfain | A61B 5/0507 |
| | | | 340/573.3 |
| 2016/0174099 A1* | 6/2016 | Goldfain | G06F 19/00 |
| | | | 375/130 |
| 2016/0178756 A1 | 6/2016 | Briggs, III et al. | |
| 2016/0180060 A1* | 6/2016 | Nelson | A01G 22/00 |
| | | | 702/19 |
| 2016/0205898 A1* | 7/2016 | Perrine | A01K 27/001 |
| 2016/0242393 A1* | 8/2016 | Kennedy | A01K 27/001 |
| 2016/0278346 A1 | 9/2016 | Golden et al. | |
| 2016/0282861 A1 | 9/2016 | Golden et al. | |
| 2016/0330577 A1 | 11/2016 | Golden | |
| 2016/0366854 A1* | 12/2016 | Mainini | A01K 11/008 |
| 2017/0048678 A1* | 2/2017 | Hong | H04W 4/30 |
| 2017/0135315 A1* | 5/2017 | Marmen | A01K 15/021 |
| 2017/0257735 A1* | 9/2017 | Kaplan | G06F 3/167 |
| 2017/0366965 A1* | 12/2017 | Chen | H04W 8/22 |

FOREIGN PATENT DOCUMENTS

| | | | | |
|---|---|---|---|---|
| EP | 3009965 A1 * | 4/2016 | ........ | A01K 11/007 |
| EP | 3217379 A1 * | 9/2017 | ........ | G02B 27/017 |
| KR | 10-2016-0097492 A | 8/2016 | | |
| KR | 10-2016-0100103 A | 8/2016 | | |
| WO | WO-2014201039 A2 * | 12/2014 | ........ | A01K 29/005 |
| WO | WO-2016010906 A1 * | 1/2016 | ........ | A01K 29/005 |
| WO | 2018-048551 A1 | 3/2018 | | |

OTHER PUBLICATIONS

"Tagg GPS Pet Tracker" Found online Dec. 8, 2016 at amazon.com. Page dated Mar. 11, 2012. Retrieved from https://www.amazon.com/Tagg-GPS-Pet-Tracker-Attachment/dp/B0077142S4/ref=cm_cr_arp_d_product_top?ie=UTF8.

"Petcare New Fashion Design Dog GPS Tracker". Found online Sep. 7, 2017 at amazon.com. Page dated Sep. 13, 2016. Retrieved from https://www.amazon.com/gp/product/B01LW2T806/ref=askAl_qh_dp_hza.

"The Nuzzle Collar". Found online Oct. 27, 2017 at hellonuzzle.com. Page dated Apr. 25, 2016. Retrieved from https://web.archive.org/web/20160425122908/http://hellonuzzle.com/nuzzle-products/.

International Search Report and Written Opinion dated Nov. 17, 2017 in PCT/US2017/045833; 15 pages.

* cited by examiner

SMART ANIMAL COLLAR SYSTEM

Field

This patent document relates generally to the field of wearable electronics, and, more particularly, to a smart animal collar that uses a number of sensors, radios and interactive components to monitor and interact with an animal.

Background

A number of wearable electronics have been designed for humans. Many of these "wearables" are focused on health and wellness. These fitness wearables are typically in the form of a bracelet and are designed to collect information from the user. These fitness wearables monitor the activity and heart rate of the user using a gyroscope and/or heart rate sensor and transmit that data to the user.

Other wearables are focused on connectivity. These wearables are typically in the form of a "smartwatch" and are designed to present information from the user's smartphone to the user. These smartwatches receive notifications from the user's smartphone via Bluetooth or from a server via Wi-Fi, alert the user with a sound or vibration and then present that notification visually on a screen.

Still other wearables provide a measure of interactivity. For example, many of the more feature-packed smartwatches allow the user to answer phone calls using a built-in microphone and speaker. In another example, many of the more feature-packed smartwatches allow the user to input information using their voice, hand gestures, a stylus or mechanical components on the watch. Many of these feature-packed smartwatches also incorporate the fitness components of provided by fitness wearables.

SUMMARY

It is an object of the present invention to provide a method and apparatus for monitoring an animal.

In one embodiment, the method comprises the steps of: at least one monitoring module for collecting data about an animal; at least one communication module for communicating the collected data with one of a base station, user device or network; a battery; and a processor that determines whether the at least one communication module is connected to one of the base station, user device or network and, based on that determination, determines the location of the animal relative to one of the base station and the user device.

In one embodiment, the apparatus comprises of: collecting data about an animal using a wearable component; communicating the collected data with one of a base station, user device or network; and determining whether the wearable component is connected to one of the base station, user device or network and, based on said determination, determining the location of the animal relative to one of the base station and the user device.

In an alternate embodiment, the above method and apparatus include at least one interaction module for interacting with the animal.

In another embodiment, the above method and apparatus include (a processor for) controlling which of the monitoring, communication and/or interaction modules are enabled or disabled depending on the determined relative location. The enabling and disabling may conserve the battery's power.

In yet another embodiment, the above method and apparatus include (a processor for) analyzing at least one of the collected data and the determined relative location and comparing the analyzed information to at least one of a predefined threshold or logic combination.

In a further embodiment, the above method and apparatus include (a processor for) notifying the user of an event correlated with the predefined threshold or logic combination.

In another embodiment, the above method and apparatus include (a processor for) providing feedback based on the collected data and at least one of the age, breed, body type, size or gender of the animal.

In another alternate embodiment, the above method and apparatus include (a processor for) determining whether the at least one communication module is connected to one of at least two user devices correlated with individual profiles and, if so, correlating the collected data with the profile of the connected user device.

In another embodiment, the method comprises the steps of: collecting data about an animal using a wearable component; communicating the collected data with at least two user devices; and determining whether the wearable component is connected to the at least two user devices and attributing the collected data to a profile corresponding to the connected user device.

In another embodiment, the apparatus comprises of: at least one monitoring module for collecting data about an animal; at least one communication module for connecting to at least two user devices; and a processor that determines whether the at least one communication module is connected to the at least two user devices and attributes the collected data to a profile corresponding to the connected user device.

BRIEF DESCRIPTION OF THE DRAWINGS

The accompanying drawings, which are included as part of the present specification, illustrate various embodiments described herein. The drawings are not drawn to scale, but rather are intended to provide a generalized description of the concepts underlying the particular illustrative embodiments thereof. For ease, the drawings use numerals to refer to specific components illustrated therein, with the same numerals used across the figures to illustrate the same or similar components across the figures.

When taken together with the general description given above and the detailed description given below, these drawings serve to explain and teach the principles described herein. However, it should be understood that the drawings herein do not illustrate every embodiment described in the detailed description nor do they accurately illustrate the full scope of the claims herein.

DETAILED DESCRIPTION

Figure 1:
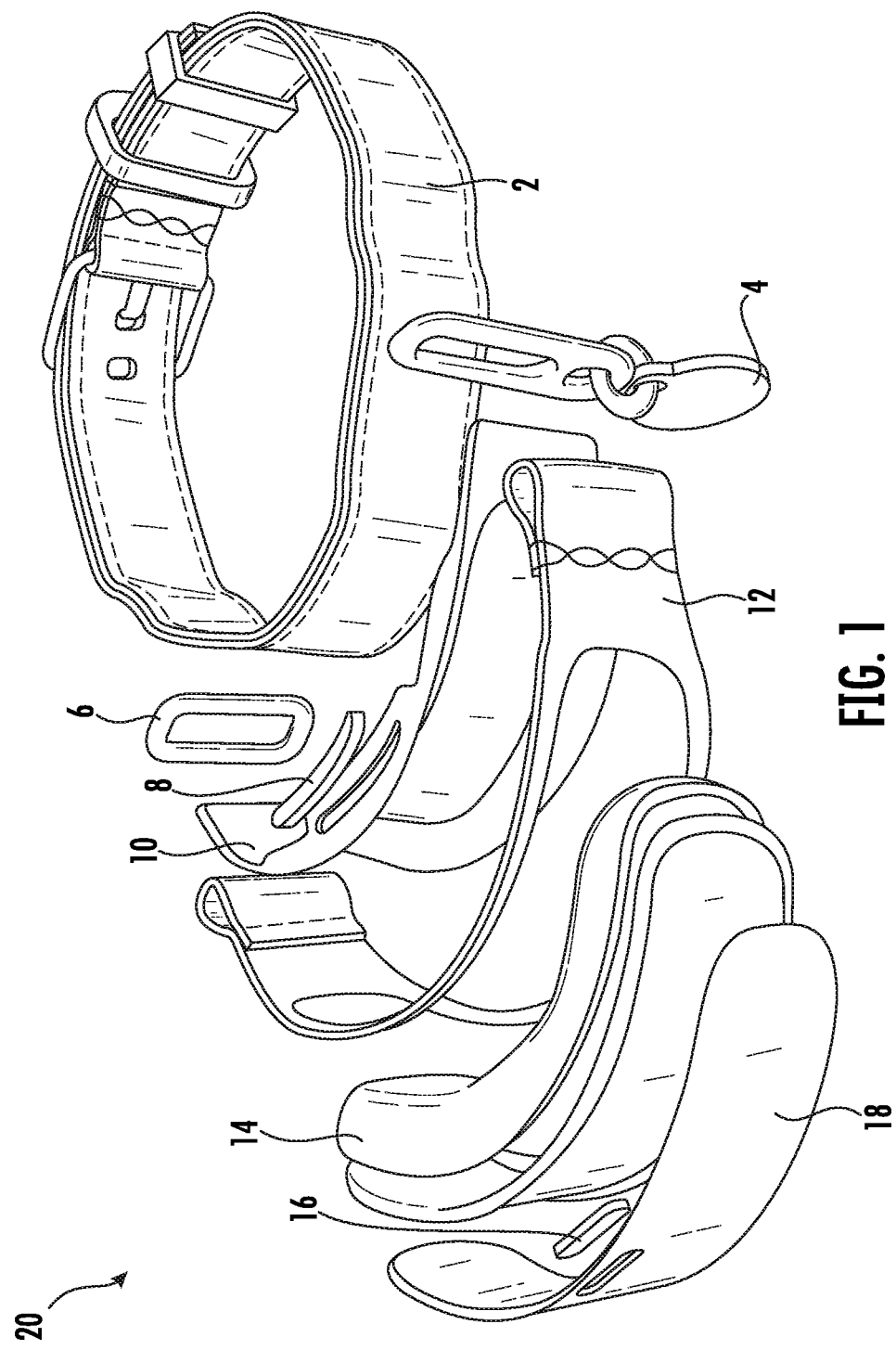
FIG. 1 shows an exploded view of a dog-collar embodiment of the wearable component of an embodiment.

The embodiments described herein are systems for monitoring and interacting with animals (preferably domesticated pets). The underlying concepts and particular embodiments are disclosed herein. These concepts may be used independently or in conjunction with one another to create a particular pet system. Certain particular embodiments are illustrated in the drawings and are described in the detailed description herein. In addition, the detailed description describes features that may not be illustrated in the drawings. These embodiments are intended to convey the concepts of the embodiments described herein and potential embodiments thereof and are not intended to limit the scope of the claims to the specific embodiments disclosed herein.

The pet-monitoring system described herein may comprise of a number of components. The system may include a wearable component for the pet. The wearable component will include both electronic components and housing components for attaching the wearable to the pet. The system may also include a base station. The base station may be stationary or portable and will also include both electronic and housing components and, in a preferred embodiment, will act as a charging station for the wearable component. These components may communicate with each other and with a user device.

As described above and herein, the wearable component described herein may be affixed to an animal. The wearable component may also be affixed to many different animals in many different ways, such as a collar, an ankle bracelet or a hair pin. FIG. 1 shows an exploded view of a dog-collar embodiment of an embodiment of the wearable component.

The dog-collar 20 includes a strap 2 that can be placed around the neck of a dog. The strap 2 is preferably adjustable. Attached to the strap 2 are a flexible face 12 and carrier housing 10 that interface with the module housing 14 that contains the electronic components of the pet wearable (as will be described in detail with reference to FIG. 2).

For example, as illustrated, two rings 4 and 6 may loop both the flexible face 12 and the strap 2 together. One or more of the loops 4 and 6 may include a tag with engraved information about the pet, such as a name and contact information for the owner. The flexible face 12 is preferable made out of leather and maintains the carrier housing 10 between it and the strap 2. The face 12 has a cutout that matches a depression in the carrier housing 10; the shape of the cutout and depression correspond to the shape of module housing 14.

The electronic components 30 of the pet wearable are maintained within the module housing 14. The module housing 14 includes a light lens 16 on its face. The light lens 16 may allow the user to see visual notifications from the electronic components 30 within the module housing 14, such as a colored light that indicates different information about the dog. The light lens 6 may also allow brighter light to shine through the module housing 14 to illuminate the area in front of the dog in the dark. The module housing 14 also includes an insert 18, with a cutout for light lens 16, which is preferably made out of leather and covers the exterior face of the module housing 14.

The module housing 14 interfaces with the carrier housing 10 to affix the electronic components 30 of the pet wearable to the pet. The module housing 14 is of a shape that fits within the depression of carrier housing 10. A locking mechanism (e.g., a pin or tab based lock) keeps the module housing 14 within the carrier housing 10. The carrier housing 10 includes a release button 8 that is operable by a user to remove the module housing 14 from the carrier housing 10.

One benefit of having module housing 14 and the electronic components 30 within be detachable from carrier housing 10 is that it allows a user to detach the electronic components 30 from the collar for easy charging without having to remove the collar from the dog. Thus, the user can still walk the dog and connect a leash to either loop 4 or 6 while the electronic components 30 charge. Also, in the event the dog runs away, the identification tag on a loop 4 or 6 of the collar can still be used to identify the pet and facilitate its return.

In alternative embodiments, the electronic components 30 may be permanently affixed to a portion of the collar or built into the collar by distributing the components along the length of the collar 20.

Figure 2:
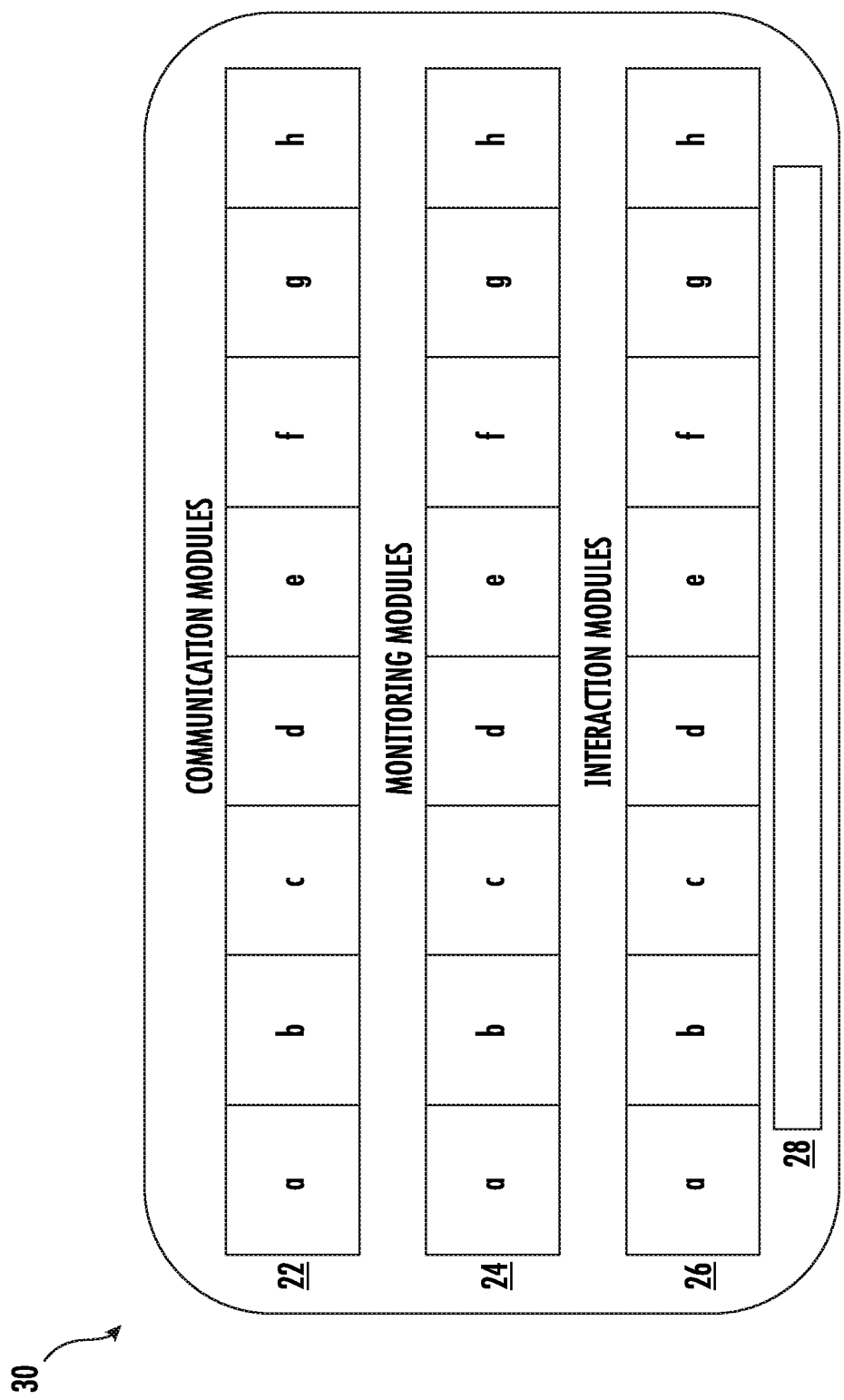
FIG. 2 is a block diagram that illustrates the modules within an embodiment the wearable component.

FIG. 2 is a block diagram that illustrates the modules within the wearable component of an embodiment of the wearable. As described with reference to FIG. 1, the module housing 14 houses the electronic components 30 of the wearable component 20. The electronic components 30 includes a number of modules, some electronic and some mechanical. A first category of modules are communication modules 22. The wearable component 20 may communicate with a number of external devices and thus includes a number of communication modules 22 to facilitate such communication. For example, the electronic components 30 may include: a GPS module 22a for communication with a GPS receiver/satellite; a cellular module 22b for communication with a mobile voice or data network; a Bluetooth module 22c for communication with one or more of a base station or user device; and a Wi-Fi module 22d for communication with one or more of a base station or user device.

A second category of modules are monitoring modules 24. The wearable component 20 may monitor the pet to gain a number of different metrics or data points that can be used to monitor the health, location or wellness of the pet and thus includes a number of monitoring modules 24 to facilitate such monitoring. For example, the electronic components 30 may include: a thermometer 24a to monitor the external temperature around the dog; a thermometer 24b to monitor the skin temperature of the dog; an accelerometer 24c to monitor the physical activity of the pet over time; a heart rate sensor 24d to monitor the physical activity of the dog; a moisture sensor 24e to monitor the humidity in the dog's environment; and a magnetometer 24f to monitor whether the dog is in proximity of an electric fence.

A third category of modules are interaction modules 26. The wearable component electronics 20 may allow a user to interact with their pet. Such interaction may be in real-time or automated. Thus, electronic components 30 includes a number of interaction modules 26 to facilitate such interaction. For example, the wearable component electronics 30 may include: a speaker 26a that can reproduce sound in the audible spectrum and allows the user to transmit audible commands to the pet (e.g., "sit") in both real-time and automatically in response to certain detected pet behavior; a tonal speaker 26b that can be used to reproduce clicks that are commonly used to train dogs; an ultrasonic speaker 26c that can reproduce sound that is inaudible to humans but within the audible spectrum for dogs; a vibrational motor 26*d* that can be used to train the dog; and lights 26*e* that can be used to either illuminate the area around the dog, communicate information to the user via blinking or colored lights, or to train the dog. In embodiments that are built for other pets, different interaction modules may be appropriate. For example, a wearable component 20 designed for cats may include a laser module 26*f* as an electronic component 30 that can be used to play with the cat or direct the cat to a specific location.

The wearable component 20 may also include a battery 28. In a preferred embodiment battery 28 is fixed and rechargeable. However, there may be application in which removable batteries 28 may be preferred.

It should be understood that, although not illustrated, the wearable component 20 may also include a processor, memory or display device.

Figure 3:
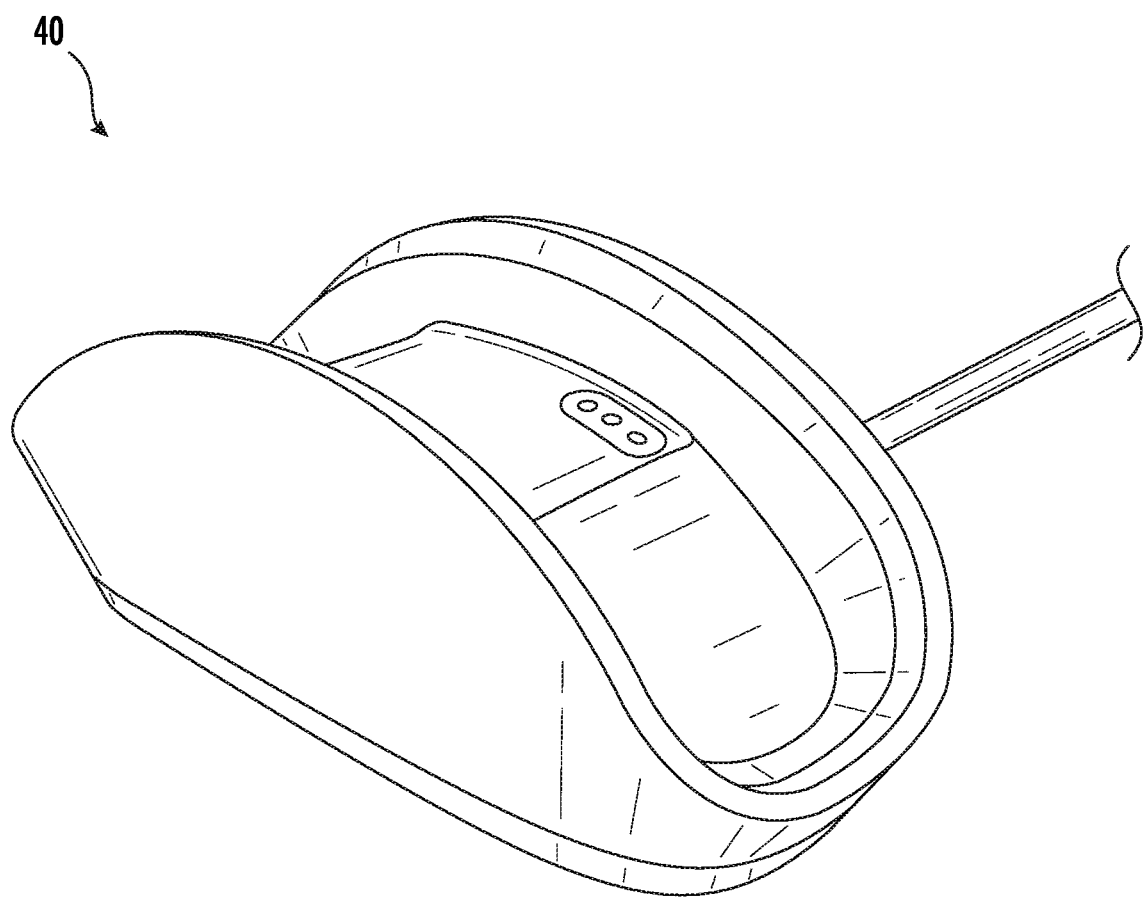
FIG. 3 shows an embodiment of the base station component.

FIG. 3 shows an embodiment of base station component 40. The base station may be powered, e.g., receive electrical current, via a wire or may be powered using a battery. When powered via wire, the base station component 40 may act as a charging base for the wearable component 30 within housing module 14.

Figure 4:
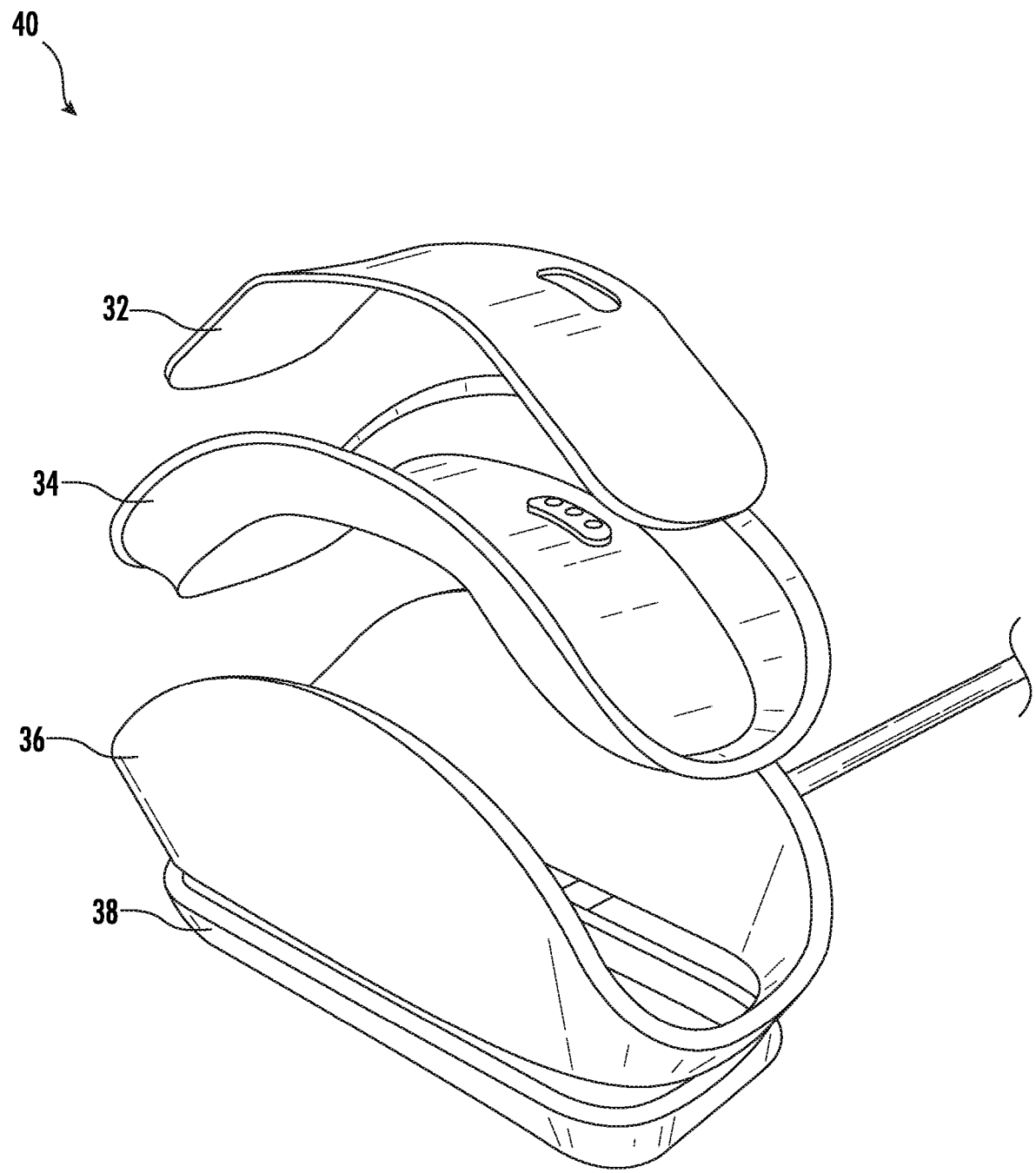
FIG. 4 shows an exploded view of an embodiment of the base station component.

FIG. 4 shows an exploded view of an embodiment of the base station component 40. The base station 40 includes a base 38. Base 38 is preferably textured at the bottom so that it will retain its location on a surface. Connected to base 38 is body 36. Body 36 houses the electronic components 50 of base station 40 that will be described in more detail in reference to FIG. 5. Atop body 36 is cap 34. Cap 34 includes contact points that allow that electronic components 50 within the body 36 to communicate with or charge wearable component 20 when it is connected. Atop cap 34 is antenna 32. Antenna 32 is preferably connected to the electronic components 50 within body 36 and facilitates communication.

Cap 34 and antenna 32 may include either a light lens or cutout so that light from the electronic components 50 can be seen outside the base station. Such light may be used to transmit information to the user via colors or patterns or may be used to light the area around the base station.

In other embodiments, the base station may be combined with other electronic components. In one such embodiment the base station 40 is combined with other communication devices such as a Wi-Fi router or home automation hub. In another such embodiment the base station 40 is combined with other pet-focused devices such as an electronic food dispenser, water fountain or litter box.

Figure 5:
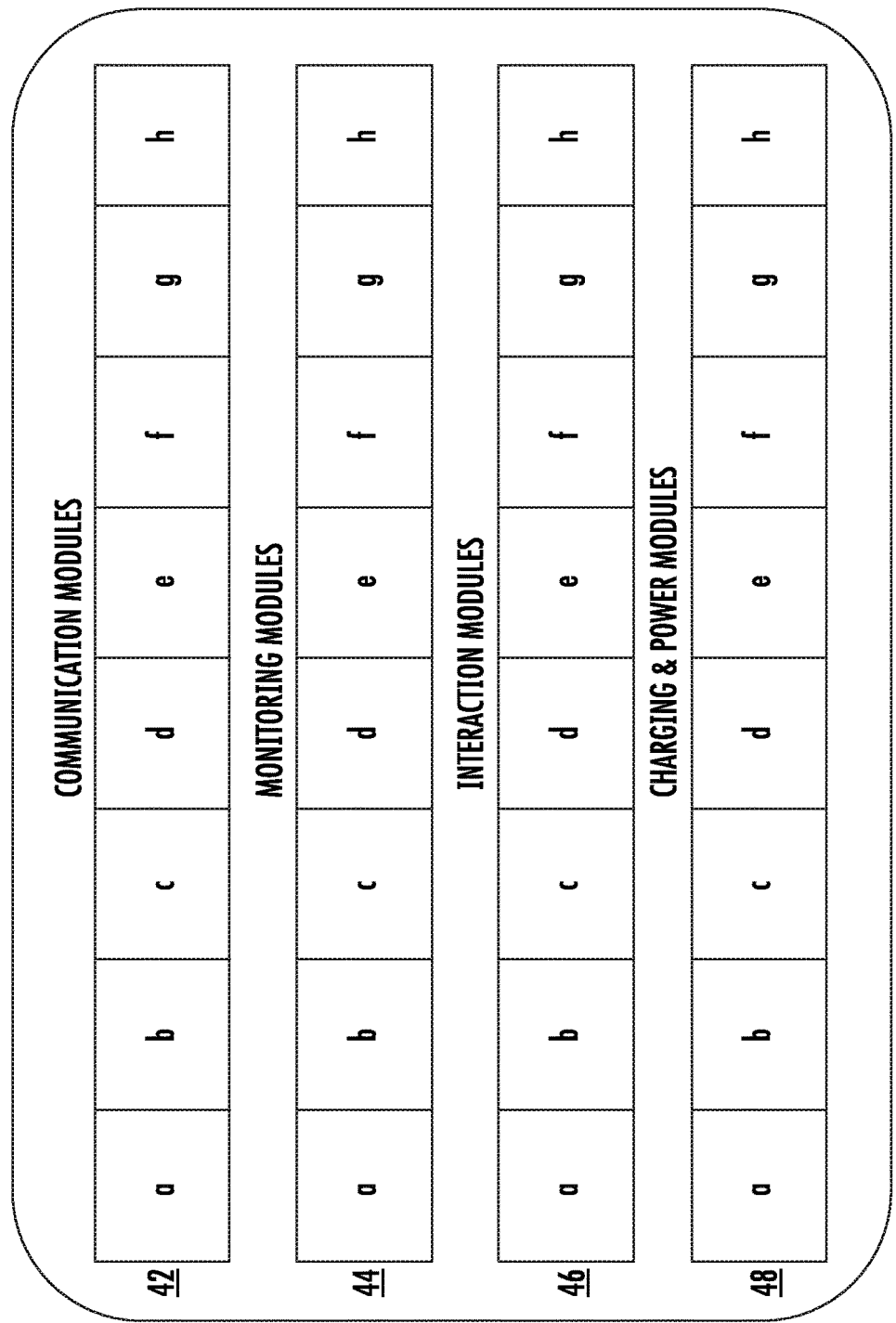
FIG. 5 is a block diagram that illustrates the modules within an embodiment of the base station component.

FIG. 5 is a block diagram that illustrates the electronic modules within an embodiment of the base station component 40. As indicated in reference to FIGS. 3 and 4, the base station component 40 includes electronic components 50. These electronic components include a number of modules. A first category of modules are communication modules 42. The base station 40 may communicate with a number of external devices and thus includes a number of communication modules 42 to facilitate such communication. For example, the base station 40 may include: a cellular module 42*a* for communication with a mobile voice or data network; a Bluetooth module 42*b* for communication with one or more of a wearable component 20 or user device; and a Wi-Fi module 42*c* for communication with one or more of a wearable component 20 or user device.

A second category of modules are monitoring modules 44. The base station 40 may monitor a number of environmental metrics. For example, the base station 40 may include: a thermometer 44*a* to monitor the external temperature in the room; a moisture sensor 44*b* to monitor the humidity in the room; a motion sensor 44*c*; an air quality sensor 44*d*; and a microphone 44*e* to monitor for audible activity, such as an accident or whether the dog is barking.

A third category of modules are interaction modules 46. The base station 40 may allow a user to interact with their pet. Such interaction may be in real-time or automated. Thus, the base station 40 includes a number of interaction modules 46 to facilitate such interaction. For example, the base station 40 may include: a speaker 46*a* that can reproduce sound in the audible spectrum and allows the user to transmit audible commands to the pet (e.g., "sit") in both real-time and automatically in response to certain detected pet behavior; a tonal speaker 46*b* that can be used to reproduce clicks that are commonly used to train dogs; an ultrasonic speaker 46*c* that can reproduce sound that is inaudible to humans but within the audible spectrum for dogs; and lights 46*d* that can be used to either illuminate the area around the dog, communicate information to the user via blinking or colored lights, or to train the dog. In embodiments that are built for other pets, different interaction modules may be appropriate. For example, a base station 40 designed for cats may include a laser module 46*e* that can be used to play with the cat or direct the cat to a specific location.

A fourth category of modules are charging and power modules 48. The base station 40 may be powered via a physical wire 48*a* to a socket connected to the power grid or via a battery 48*b* that is either rechargeable or replaceable.

It should be understood that, although not illustrated, the base station 40 may also include a processor, memory or display device.

Figure 6:
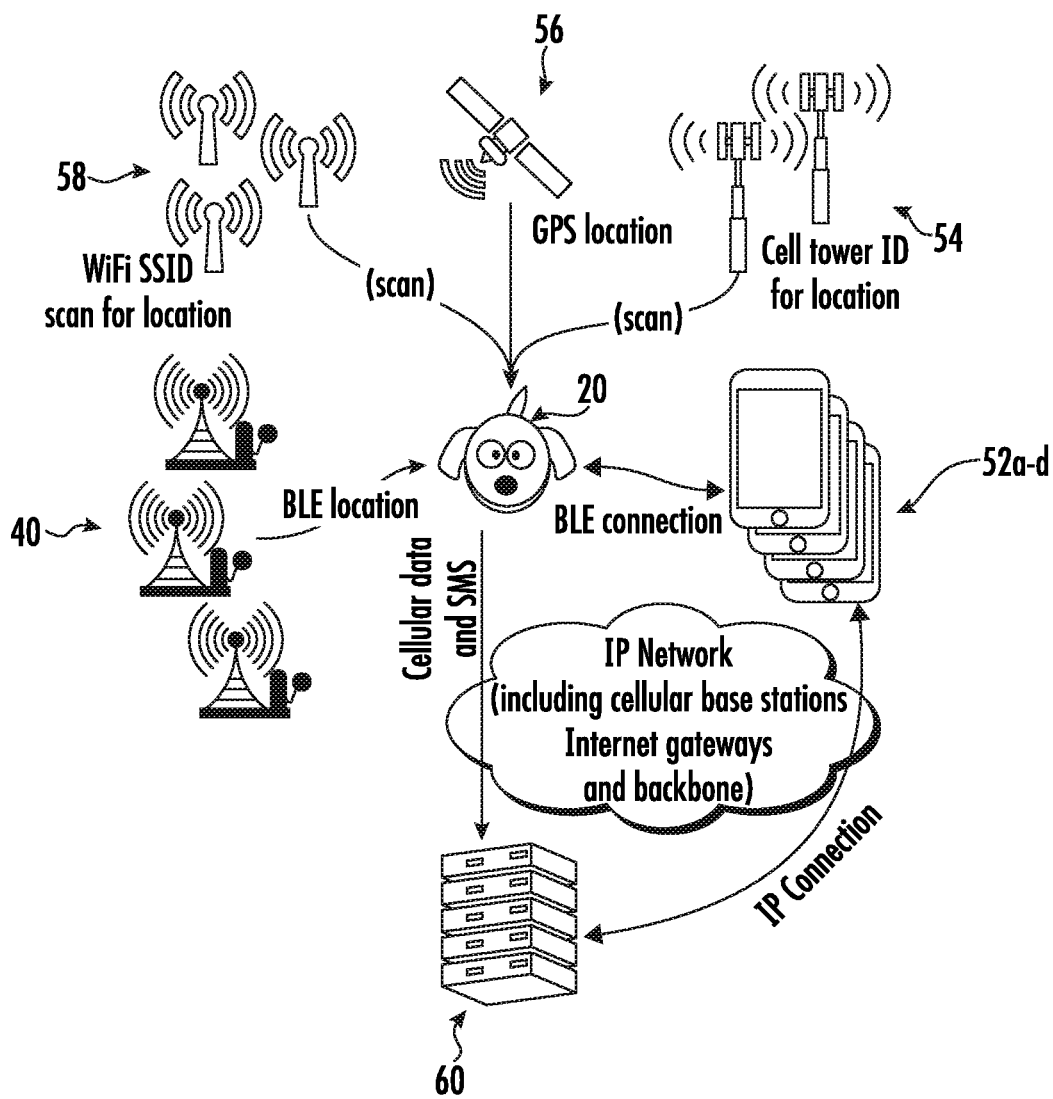
FIG. 6 is a communication diagram that illustrates the potential types of communications that are enabled by the various embodiments.

FIG. 6 is a communication diagram that illustrates the potential types of communications that are enabled by the embodiments described herein. As described with reference to FIG. 2, the wearable component 20 includes a number of communication modules 22. These modules allow the wearable component 20 to communicate with: the base station 40 using, preferably, a low energy radio such as Bluetooth LE; a user device 52 (such as a smart clip, smart tag, smart bracelet, smartwatch, smartphone, tablet, laptop or desktop) using, preferably, a low energy radio such as Bluetooth LE; cellular towers 54 using, preferably, cellular radio to triangulate position (e.g., Assisted-GPS); GPS satellites 56; Wi-Fi access points 58 to triangulate position (e.g., Wi-Fi positioning system); a server 60 using, either cellular data, SMS text messaging, or Wi-Fi.

Figure 7:
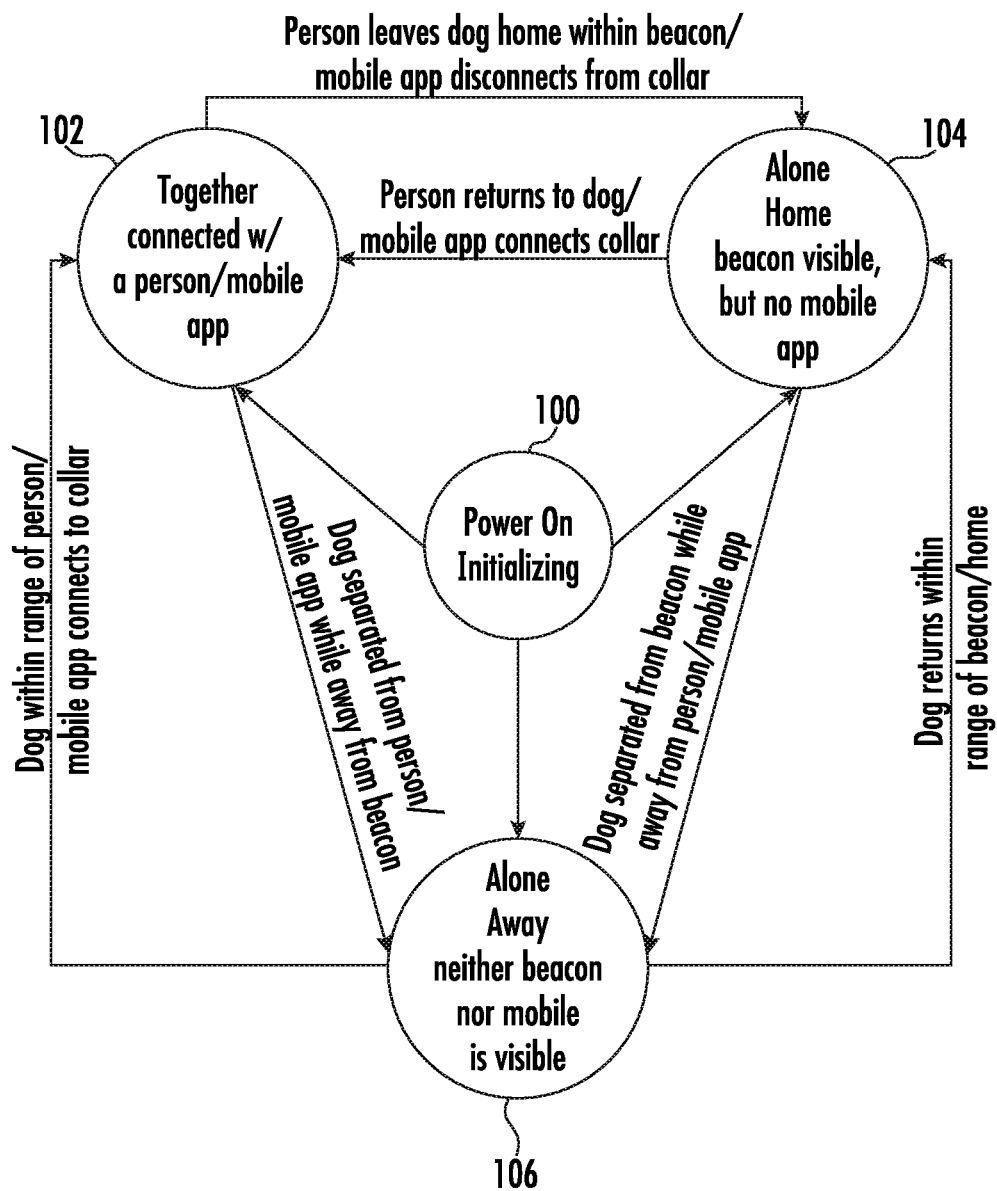
FIG. 7 is a flow diagram of that illustrates how embodiments of the wearable component of the present invention may interact with the base station component.

FIG. 7 is a state diagram that illustrates how embodiments of the wearable component may interact with base station component 40. In this example, the wearable component 20, base station 40 and user devices 52 are all used to determine the state of whether the dog and owner are together 102, the dog is home alone 104 or the dog is away alone 106.

The process begins upon powering on the wearable component 20 in state 100. The wearable component 20 looks for the base station 40 and for a user device 52. In a preferred embodiment, the wearable component 20 looks for other components by either pinging for them or trying to establish a communication connection with those components (e.g., via Bluetooth or Bluetooth LE). In one alternate embodiment, the wearable component 20 may look for other components by sending out a global ping that can be responded to from any available components within range. In another alternate embodiment, the wearable component 20 may survey whether components within their range are broadcasting (e.g., Wi-Fi).

If the wearable component 20 is able to detect/connect with the user device 52, then the system knows that both the owner and pet are together (e.g., home or elsewhere) and can configure itself to state 102. If the wearable component 20 is able to detect/connect to the base station 40 but not to the user device 52, then the system knows that the pet is home (or wherever the base station is located) alone, without its owner, and can configure itself to state 104. If the wearable component 20 cannot detect/connect with either the base station 40 or the user device 52, then the system knows that the dog is away alone and can configure itself to state 106. In other implementations a fourth state may be determined based on whether the wearable component's 20 can detect/connect with both the base station 40 and the user device 52. If the wearable component 20 is able to detect/connect to both the base station 40 and the user device 52, then the system knows that both the dog and the user are home.

The above process runs continuously. Thus, while the owner may be home with the dog when initializing and powering up the wearable component 20 (state 102), when the owner leaves the home, the wearable component will lose its connection with the user device 52 and the system will move from state 102 to state 104. Similarly, when the owner comes home, the wearable component 20 will regain its connection with the user device 52 and the system will move from state 104 to state 102. Should the dog run away from the home while the owner is away from home, the wearable component 20 will lose its connection with the base station 40 and the system will move from state 104 to state 106. Should the dog run away from home while the owner is home, the wearable component 30 will lose its connection with both the base station 40 and the user device 52 and the system will move from state 102 to state 106.

Figure 8:
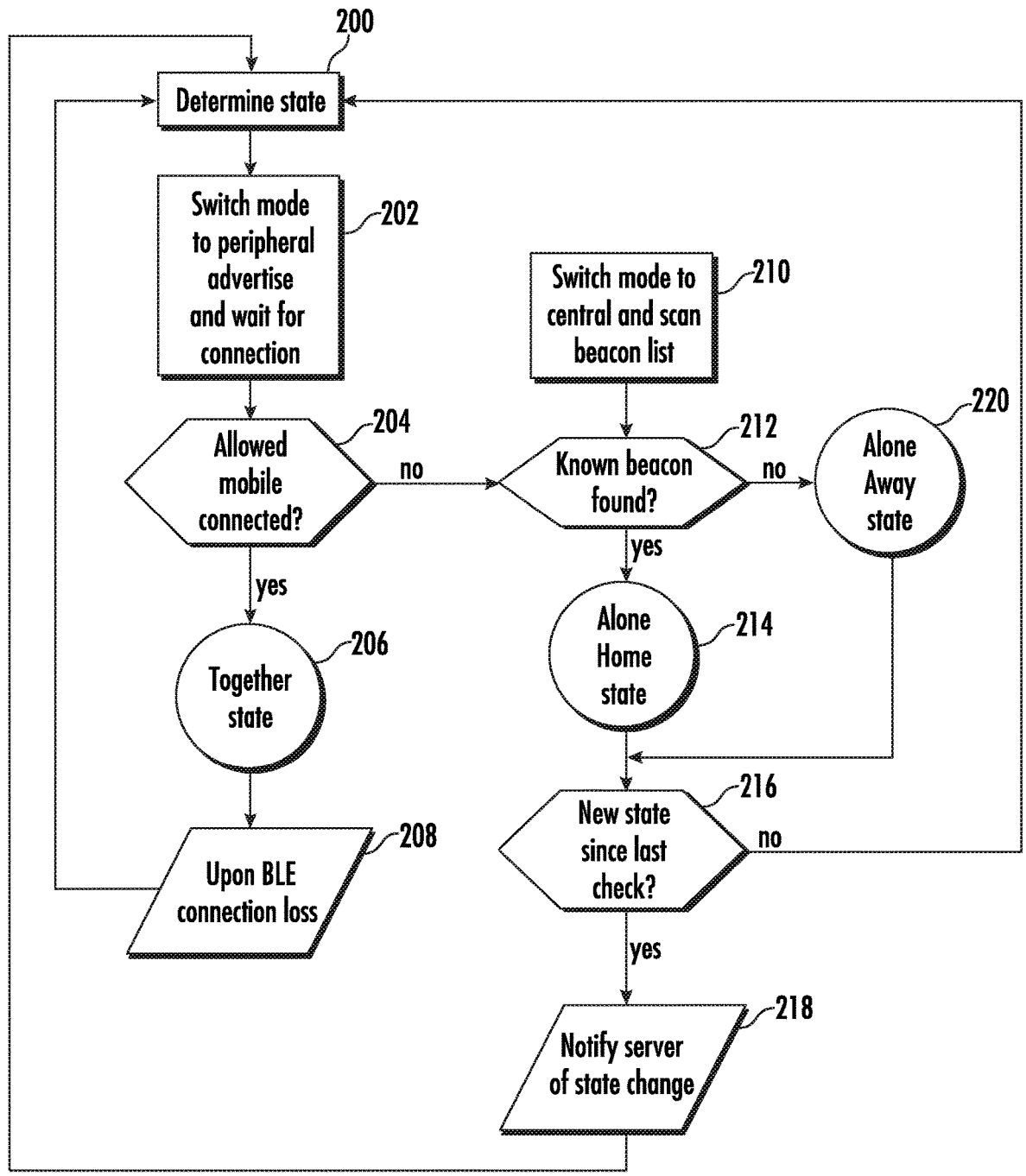
FIG. 8 is a flow diagram of that illustrates how embodiments of the wearable component of the present invention may interact with the base station component.

FIG. 8 is a flow diagram of that illustrates how embodiments of the wearable component may interact with the base station component 40. Similar to FIG. 7, in this example the wearable component 20, base station 40 and user devices 52 are all used to determine the state of whether the dog and owner are together 206, the dog is home alone 214 or the dog is away alone 220.

The process begins by entering determine state step 200. To determine state the wearable component 20 switches to peripheral mode and seeks out a connection with the user device 52 in step 202. The wearable component 20 then determines if it was able to connect with the user device 52 in step 204. If the wearable component 20 was able to connect to user device 52, it sets the together state in step 206 and stays they until it loses a connection with user device 52. When the wearable component 20 loses its connection with the user device 52 in step 208 the wearable component once again enters determine state step 200.

If the wearable component 20 was not able to connect to user device 52 in step 204 then the wearable component 20 switches to a central mode and scans for beacons such as that in base station 40 in step 210. The wearable component 20 then determines if it was able to connect with the base station 40 in step 212. If the wearable component 20 was able to connect with the base station 40, it sets the alone home state in step 214. If the wearable component 20 was not able to connect with the base station 40 in step 212, it sets the alone away state in step 220.

Once set to either the alone away state in step 220 or the alone home state in step 214 the wearable component 20 continuously checks for a state change in step 216. If there is no state change, then the wearable component 20 reenters determine state step 200 and continuously monitors for the user device 52. If there is a state change (the wearable component 20 either gains or loses a connection with the base station 40), then wearable component 20 notifies the server 60 in step 218 and reenters determine state step 200.

Although not illustrated, a purpose of the system is to efficiently use the physical electronics of the wearable component 20, the base station 40 and the user device 52 by determining the states indicated in FIG. 7.

For example, when the wearable component 20 is connected to the user device 52 and enters together state 206, the cellular, the Wi-Fi and GPS radios may be disabled and the Bluetooth (low energy) radio may be enabled. When the wearable component 20 is connected to the base station 40 and enters home state 214, the Wi-Fi and GPS radios may be disabled and the cellular and Bluetooth (low energy) radios may be enabled. When the wearable component is not connected to either the base station 40 or the user device 52 and enters alone away state 220, the Wi-Fi, GPS, cellular and Bluetooth (low energy) radios may be enabled.

To illustrate, as described in reference to FIG. 2, the wearable component 20 can include a GPS radio as one of its communication modules 22. If the system were designed to track the location of the pet over time, regardless of the state, then the system can minimize the use of the GPS radio in the wearable component 20 and its associated drain on the battery 28 by taking advantage of both the state information and the user device 52: when the wearable component 20 is connected to the base station 40 and enters home state 214, it will log the dog's GPS location as that of the base station (e.g., home); when the wearable component 20 is connected to the user device 52 and enters together state 206, the program (or app) on the user device 52 will use its own location information gathered through the use of its own GPS radio to log the location of the dog; and, consequently, only when the wearable component is not connected to either the base station 40 or the user device 52 and enters alone away state 220, will it have to use its own Wi-Fi, GPS or cell radios to determine its own location.

In another example, the wearable component 20 can connect with multiple user devices 52 in order to gain information about the dog and distribute that information to all users. For instance, assume that the wearable component 20 is set up to connect with the user device of mom 52a, dad 52b, daughter 52c or son 52d. If the dog is home then the wearable component 20 will be connected to base station 40 and will be in home alone state 214. When son comes home from school with their user device 52d, the wearable component 20 will connect with device 52d and the system will move to together state 206. The system can then use a number of metrics to infer if son has taken the dog on a walk: the system can monitor whether the dog's physical activity is high using an accelerometer monitoring module 24; the system can use the GPS data obtained by a program running on the user device 52d; or the system can monitor whether the wearable component 20 loses its connection to the base station 40 but maintains its connection with user device 52d. If the dog is determined to have been walked, then the system can indicate that the task was specifically performed by son and log that information and/or notify mom and/or dad.

By connecting to multiple user devices 52, the system can also quantify how much time different users spend with the dog.

In yet another example, the wearable component 20 includes monitoring modules 24 that collect information about the pet. The wearable component 20 can be designed to store the monitored information locally and to only transmit that information at certain times to conserve battery 28.

The wearable component 20 can be designed to only transmit monitored information when already connecting to such devices to update its state as described in FIGS. 7 and 8. In such an embodiment, when the wearable component 20 connects with the user device 52 and enters together state 206, it transmits its stored monitoring information to user device 52. But when the wearable component 20 connects with the base station 40 and enters alone home state 214, it transmits its stored monitoring information to the base station 40, which in turn transmits that information to server 60, which further transmits that information to user device 52.

The wearable component 20 can also be designed to periodically transmit the monitored information to an available device. In such an embodiment, the wearable component transmits monitored information on a periodic time interval and determines the destination based on its state: when the wearable component 20 is connected to the user device 52 and enters together state 206, it will send the monitored information to the user device at the next timed interval; when the wearable component 20 is connected to the base station 40 and enters home state 214, it will send the monitored information to the base station 40 at the next timed interval; and when the wearable component is not connected to either the base station 40 or the user device 52 and enters alone away state 220, it will send the monitored information directed to the server 60 at the next timed interval.

Another purpose of the system is to automate interactions based on connection states or other input data. Such automation can be used to notify the user of the pet's state and activity. For example, a user can be notified via their device 52 or the base station 40 if: the pet runs away from the vicinity of the owner (the wearable component 20 loses its connection with the user device 52); the pet runs away from the vicinity of the home (the wearable component 20 loses its connection with the base station 40); the pet runs out of a pre-defined geographically defined region (e.g., geo-fence) (the wearable component determines that the GPS coordinate measured is outside of a pre-set region); the information monitored by the wearable component 20 indicates that the dog has had a period of high activity that is associated with the dog having taken a walk; the information monitored by the wearable component 20 indicates that the dog is in a particularly dangerous (e.g., cold, hot, or wet) environment; the information monitored by the wearable component 20 indicates that the pet has a fever and is sick; or the information monitored by the wearable component 20 or by the base station 40 indicates that there was a loud noise that warrants the user's attention.

Such automation can also be used to train the pet. In a first example, many dog trainers use a clicking device to train dogs to respond to "clicks." Thus, one of the interaction modules within the wearable component 20 and/or the base station 40 may be a tonal speaker that can reproduce a similar clicking sound. If the dog is trained to return home in response to clicks, then if the dog runs away from the home and owner and the system enters alone away state 220 then the wearable component 20 can create a clicking sound to encourage the dog to return home. The clicking sound can automatically cease when the dog is found by having the wearable component 20 cease clicking when it connects to either the base station 40 and enters alone home state 214 or connects to the user device and enters together state 206. If the dog is trained to stop barking in response to clicks or cease aggressive behavior, then if there is a loud sound detected by either the wearable component 20 or the base station 40 and/or if the wearable component 20 indicates a high rate of activity for the dog, then the wearable components can create a clicking sound to discourage the dog from barking or to calm to dog. If the dog is trained to stay within an electronic fence, then a magnometer can be included as a monitoring module 24 on the wearable component 20 and when the magnometer indicates that the dog has reached the fence, the wearable component 20 can create a clicking sound to encourage the dog to stay back from the fence and return to the designated area.

In another example, if the dog is trained to respond to verbal commands, then one of the interaction modules within the wearable component 20 or the base station 40 can include a speaker that can reproduce verbal commands. Then, if the dog runs away (e.g., the system enters alone away state 220), excessively barks (e.g., as detected by microphones in either the wearable component 20 or the base station 40), or exhibits an unusually high rate of activity (e.g., as detected by a heart rate monitoring module on wearable component 20), then the wearable component 20 of base station 40 can issue a verbal command automatically.

Yet another purpose of the system is to provide feedback to the user regarding the animal's health and activity. For example, a user may create a profile for the animal to be monitored that includes information relating to the animal, such as the age, breed, body type, size, and gender. In addition, the system can monitor the data collected about the animal over time and determine what are the normal expected ranges of such collected data and include those ranges in the animal's profile. The system can then use the data collected from the monitoring modules and use the information in the animal's profile to provide feedback to the user. Such feedback may relate to the energy the animal has expended, the animal's energy intake or the animal's weight.

The above description and drawings are only to be considered illustrative of specific embodiments, which achieve the features and advantages described herein. Modifications and substitutions to specific process conditions can be made. Accordingly, the embodiments in this patent document are not considered as being limited by the foregoing description and drawings.

What is claimed is:

1. An animal collar system for monitoring an animal, the animal collar system comprising:
   a user device associated with a user;
   a base station; and
   an animal collar device comprising
      at least one monitoring component configured to collect data about the animal,
      at least one communication component configured to communicate the data about the animal to said base station and said user device,
      a battery coupled to said at least one monitoring component and said at least one communication component, and
      a processor coupled to said battery and configured to determine whether said at least one communication component is connected to at least one of said base station and said user device to provide a location of the animal relative to said base station and said user device, based upon the location of the animal, cause the animal collar device to enter one of a plurality of communication states, the plurality of communication states comprising
an away alone state when not connected to said base station and said user device, and
a home alone state when connected to said base station and not connected to said user device, and
when in the away alone state, cause said at least one communication component to transmit the data about the animal via an external network.

2. The animal collar system of claim 1, wherein said at least one monitoring component includes at least one of a first thermometer configured to measure a temperature of the animal, a second thermometer configured to measure an external temperature around the animal, an accelerometer, a heart rate sensor, a moisture sensor and a magnetometer.

3. The animal collar system of claim 2, wherein said processor is configured to generate threshold ranges for the data about the animal based upon values of the data about the animal over time.

4. The animal collar system of claim 1, wherein said animal collar device comprises at least one interaction component configured to interact with the animal based upon user input.

5. The animal collar system of claim 4, wherein said at least one interaction component is configured to interact with the animal in response to the data about the animal.

6. The animal collar system of claim 4, wherein said at least one interaction component includes at least one of a speaker, a vibrational motor, a light, or a laser.

7. The animal collar system of claim 4, wherein said at least one interaction component is configured to interact with the animal based upon the location of the animal relative to said base station.

8. The animal collar system of claim 1, wherein said at least one communication component includes at least one of a global positioning system (GPS) radio, a cellular transceiver, a Bluetooth transceiver, and a Wi-Fi transceiver.

9. The animal collar system of claim 1, wherein said processor is configured to selectively enable and disable said at least one monitoring component based upon the location of the animal relative to said base station.

10. The animal collar system of claim 1, wherein said processor is configured to selectively enable and disable said at least one communication component based upon the location of the animal relative to said base station.

11. The animal collar system of claim 1, wherein said processor is configured to process at least one of the data about the animal and the location of the animal relative to said base station based upon a predefined threshold and a logic combination.

12. The animal collar system of claim 11, wherein said processor is configured to notify the user of an event correlated with the predefined threshold and the logic combination.

* * * * *